(12) United States Patent
Micali

(10) Patent No.: US 11,405,186 B2
(45) Date of Patent: Aug. 2, 2022

(54) USING VIRTUAL BLOCKCHAIN PROTOCOLS TO IMPLEMENT A FAIR ELECTRONIC EXCHANGE

(71) Applicant: Algorand Inc., Boston, MA (US)

(72) Inventor: Silvio Micali, Brookline, MA (US)

(73) Assignee: Algorand, Inc., Boston, MA (US)

( * ) Notice: Subject to any disclaimer, the term of this patent is extended or adjusted under 35 U.S.C. 154(b) by 290 days.

(21) Appl. No.: 16/709,719

(22) Filed: Dec. 10, 2019

(65) Prior Publication Data

US 2020/0186334 A1    Jun. 11, 2020

Related U.S. Application Data

(60) Provisional application No. 62/778,482, filed on Dec. 12, 2018, provisional application No. 62/777,410, filed on Dec. 10, 2018.

(51) Int. Cl.
*H04L 9/08* (2006.01)
*H04L 9/06* (2006.01)
*H04L 9/32* (2006.01)

(52) U.S. Cl.
CPC .......... *H04L 9/0825* (2013.01); *H04L 9/0637* (2013.01); *H04L 9/0643* (2013.01); *H04L 9/3247* (2013.01)

(58) Field of Classification Search
None
See application file for complete search history.

(56) References Cited

U.S. PATENT DOCUMENTS 11,165,756 B2 * 11/2021 Mandal ................. H04L 9/0819
2017/0046651 A1 * 2/2017 Lin ...................... H04L 63/061

FOREIGN PATENT DOCUMENTS

WO    WO 2018200215    11/2018

OTHER PUBLICATIONS

International Search Report and Written Opinion in International Application No. PCT/US2019/065524, dated Apr. 2, 2020, 15 pages.
Kalamsyah et al., "Digital Contract Using Block Chaining and Elliptic Curve Based Digital Signature", 6th International Conference on Information and Communication Technology (ICOICT), IEEE, pp. 435-440, 2018.

* cited by examiner

*Primary Examiner* — William J. Goodchild
(74) *Attorney, Agent, or Firm* — Frank L. Gerratana; Mintz Levin Cohn Ferris Glovsky and Popeo, P.C.

(57) ABSTRACT

Methods for a virtual blockchain protocol include generating a public key and a private key for transmitting a message from a sender to a recipient. The sender encrypts the message using the public key and a cryptographic key of the recipient to generate a first data package. The sender signs a hash function of the first data package using a cryptographic key of the sender to generate a third data package. The sender transmits the first data package and the third data package to the recipient. The sender receives a signed version of the third data package signed using the cryptographic key of the recipient. The sender determines that the signed version of the third data package has been posted to a blockchain. The sender posts the private key to the blockchain.

21 Claims, 3 Drawing Sheets

USING VIRTUAL BLOCKCHAIN PROTOCOLS TO IMPLEMENT A FAIR ELECTRONIC EXCHANGE

CROSS-REFERENCE TO RELATED APPLICATIONS

This application claims the benefit of U.S. Provisional Application 62/777,410, filed on Dec. 10, 2018, and U.S. Provisional Application 62/778,482, filed on Dec. 12, 2018, both of which are incorporated herein by reference in their entirety.

TECHNICAL FIELD

This description relates generally to the use of virtual blockchain protocols to implement a fair electronic exchange (FEE).

BACKGROUND

A public ledger is a tamperproof sequence of data that can be read and augmented. Shared public ledgers can revolutionize the way a modern society operates. Traditional transactions—such as payments, asset transfers, and titling—can be secured in an order in which they occur. New transactions—such as cryptocurrencies and smart contracts can be enabled. Corruption can be reduced, intermediaries removed, and a new paradigm for trust can be ushered in.

However, traditional public ledgers do not achieve their potential. Traditional public ledgers can put all trust on a single entity, who can arbitrarily refuse to publicize payments made by given keys, and is vulnerable to a cyberattack. Indeed, once the single central authority is compromised, so is the entire system. Some traditional systems are expensive to run, waste computation and other valuable resources, concentrate power in the hands of new entities (miners), suffer from considerable ambiguity (forks), and have long latency and small throughput. Other traditional implementations are permissioned, or assume the ability of punishing malicious users, or both, and/or trust that some subset of users are immune to cyberattacks for a suitably long time.

SUMMARY

The embodiments herein relate to methods, systems, and apparatuses to implement virtual blockchain protocols. A first computer device generates a public key and a corresponding private key. The public key is for transmitting a message from a sender to a recipient. The first computer device is associated with the sender. The first computer device encrypts the message using the public key and a cryptographic key of the recipient to generate a first data package. The cryptographic key of the recipient indicates an identity of the recipient. The first computer device signs a second data package using a cryptographic key of the sender to generate a third data package. The cryptographic key of the sender indicates an identity of the sender. The second data package includes the identity of the sender, the identity of the recipient, the public key, and a hash function of the first data package.

The first computer device transmits the first data package and the third data package to a second computer device associated with the recipient. The first computer device receives a signed version of the third data package from the second computer device. The signed version of the third data package is signed using the cryptographic key of the recipient. The first computer device determines that the signed version of the third data package has been posted to a blockchain. Responsive to the determining that the signed version of the third data package has been posted to the blockchain, the first computer device posts the private key to the blockchain for decrypting the cryptographic message by the recipient.

The benefits and advantages of the embodiments disclosed herein include reduced computation effort compared to other techniques. The blockchain remains in the background and is used very rarely, if at all, in execution of the virtual blockchain protocol. When a fair electronic exchange (FEE) is implemented using the virtual blockchain protocol, commercially equitable transactions conducted by honest parties are provided by the protocol without use of the blockchain. A party is denoted as being "honest," if the party does not attempt to obtain a benefit of a transaction at the expense of another party. On the other hand, if a first party receives the benefit of a transaction while a second party does not, the second party can invoke the blockchain to restore the commercial equitability of the transaction.

The virtual blockchain protocol provides commercially equitable exchange in a more efficient and more economical manner compared to other techniques. The blockchain intervenes very rarely in the virtual blockchain protocol. When both parties are honest, the transaction is conducted off-chain. The blockchain is utilized only when a commercially inequitable transaction occurs, to restore the commercial equitability of the transaction. Failure to perform is in fact discouraged because the advantages gained by failing to perform are reduced compared to other techniques. Transaction costs are reduced compared to other techniques because parties transact bilaterally by bypassing the blockchain, avoiding the payment of transaction fees for posting information in blocks and avoiding the wait for a new block to be generated.

Cryptoasset and other transactions, such as certified e-mail or electronically signed contracts, can be produced in a shorter time using virtual blockchain protocols compared to other techniques and transactions are finalized sooner. Further benefits and advantages include privacy and confidentiality for transactions. The virtual blockchain protocols can meet a regulatory regime they are subjected to for ensuring commercially equitable transactions. Virtual blockchain protocols can reduce the need for more complex and computationally expensive smart contracts.

DETAILED DESCRIPTION

A trusted third party is sometimes used to secure a transaction, for example, transmission of certified e-mail, signing and delivering an electronically signed contract, or a cryptoasset transaction. However, a transaction involving a trusted third party can be inefficient or expensive because such a trusted third party can slow down the transaction and demand remuneration for its services. A blockchain can be used in place of a trusted third party in certain settings at a reduced cost. However, a blockchain can also incur costs in terms of processing time and monetary constraints. The embodiments disclosed herein provide virtual blockchain protocols to implement a fair electronic exchange (FEE). An FEE represents a set of transactions that includes certified e-mail, electronic contract signing, and other implementations.

A virtual blockchain protocol is one that can be used to securely complete a two-party transaction in the presence of a blockchain, such that the blockchain is not used when both parties are honest and neither party incurs an additional expense. If a first party is not honest, the blockchain is minimally used by the virtual blockchain protocol, such that the second party is not disadvantaged. Hence, a virtual blockchain protocol is one in which the blockchain operates in the background and is not invoked unless a party acts in a commercially inequitable manner.

Figure 1:
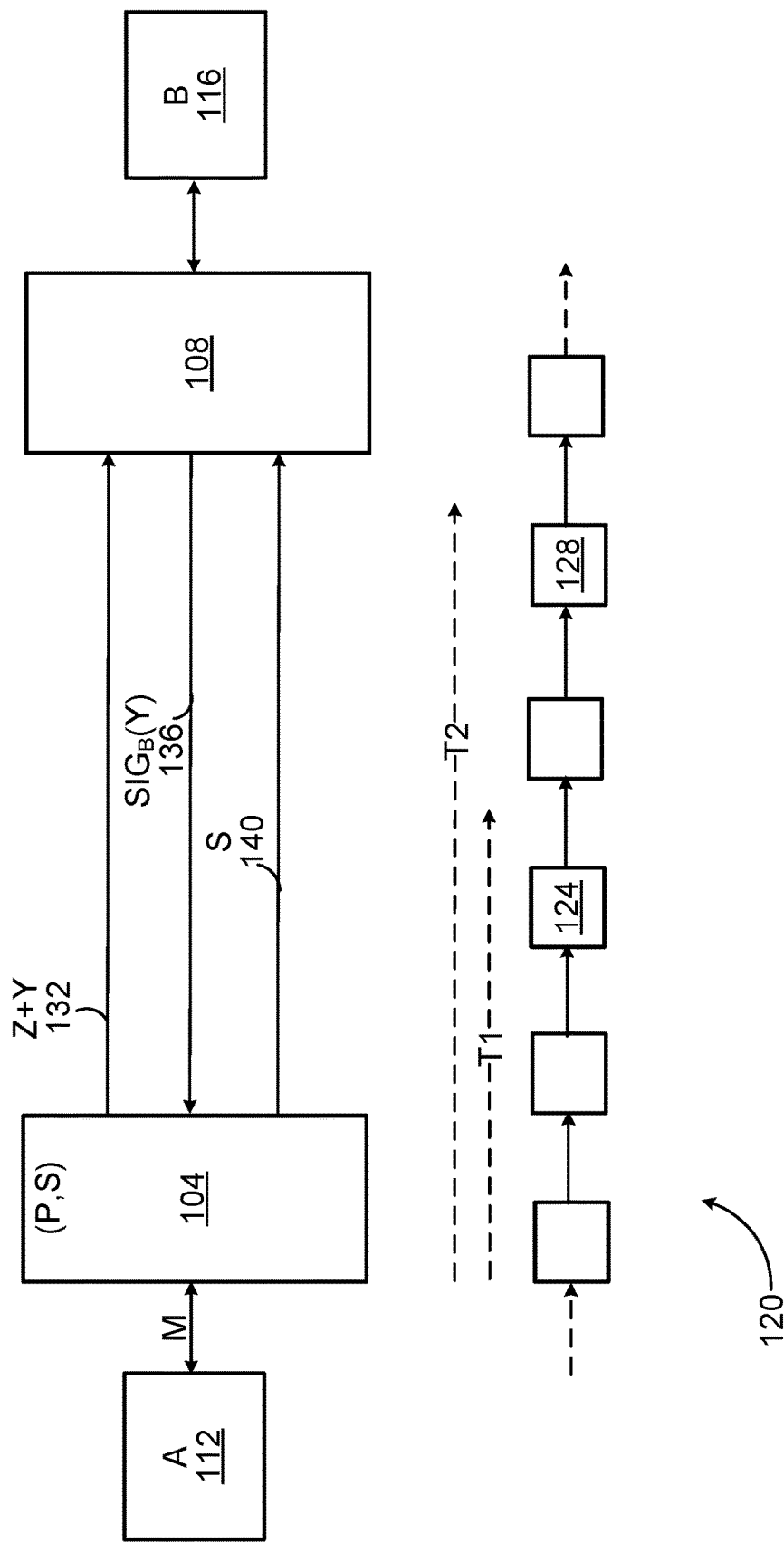
FIG. 1 illustrates an example virtual blockchain protocol.

FIG. 1 illustrates an example virtual blockchain protocol. The illustration of FIG. 1 includes a sender 112, a computer device 104, a recipient 116, a computer device 108, and a blockchain 120. The sender 112 is an entity that wishes to transmit a message M to the recipient 116 to perform a transaction, such as transmission of certified e-mail or a cryptoasset transaction. For example, the sender 112 can represent a cryptoasset account, a company, a university, a single person, or a combination thereof. The computer device 104 is communicably coupled to the sender 112 and can be a smartphone, a tablet, a laptop, or another computer device implemented using the components illustrated and described in more detail with reference to FIG. 3. The recipient 116 is an entity for whom the message M is intended. For example, the recipient 116 can represent a cryptoasset account, a company, a university, a single person, or a combination thereof. The computer device 108 is communicably coupled to the recipient 116 and can be a smartphone, a tablet, a laptop, or another computer device implemented using the components illustrated and described in more detail with reference to FIG. 3.

The computer devices 104, 108 use a virtual blockchain protocol to transmit the message M from the sender 112 to the recipient 116. The virtual blockchain protocol enables bilateral transactions, such as used to implement an FEE. When the sender 112 and recipient 116 are both honest parties, the blockchain 120 is in fact not used to perform the transaction. A party is denoted as being "honest," if the party does not attempt to obtain a benefit of a transaction at the expense of another party. For example, consider a scenario in which the sender 112 has an automobile title and the recipient 116 has an electronic address of a cryptoasset account. Neither party initially knows the other's asset, but will recognize it if it can access the asset. If the sender 112 is "honest," it will not attempt to obtain the electronic address of the cryptoasset account while failing to transmit the automobile title to the recipient 116.

The sender 112 and recipient 116 may each use the blockchain 120 once, to register information about themselves, and can then honestly interact with other honest parties without involving the blockchain 120. The registered information can include, for example, a public cryptographic key A of the sender 112 and a public cryptographic key B of the recipient 116. The public cryptographic keys A, B are also sometimes referred to as public keys or public encryption keys. A cryptographic key can be a public key and/or a private (secret) key that is used for digitally signing, encrypting, or decrypting data, such as a message. When one of the two parties is not honest, the virtual blockchain protocol resolves the problem by enabling posting of information on the blockchain 120, such that the honest party is not disadvantaged.

In some embodiments, the virtual blockchain protocol enables blocks (e.g., blocks 124, 128) of the blockchain 120 to incorporate time information with a particular level of accuracy. In other embodiments, the virtual blockchain protocol measures time in block units. For example, posting information Y on the blockchain 120 within a given amount of time from the appearance of the block 124 results in posting Y in one of the 25 blocks following block 124, for example, block 128.

The computer device 104 generates a public key P and a corresponding private key S. The public key P is for transmitting the message M from the sender 112 to the recipient 116. The sender 112 has its own unique identifier A, for example, a public encryption key, a public signature key, or a public cryptographic key. The sender 112 also has its own corresponding secret key or private decryption key. The public cryptographic key A of the sender 112 can be posted on the blockchain 120 when the sender 112 enrolls in a certain system, for example, a certified e-mail system. Similarly, the recipient 116 has a unique identifier B, for example, a public cryptographic key. The sender 112 can sign the message M to generate a signed message denoted by $SIG_A(M)$. The sender 112 can encrypt the message M to generate an encrypted message denoted by $E_A(M)$.

The computer device 104 encrypts the message M using the public key P and a cryptographic key B of the recipient 116 to generate a first data package $Z=E_{PB}(M)$, where $E_{PB}(M)$ represents the encryption of the message M using a joint public key PB, that is, the encryption of the message M using the public key P and cryptographic key B such that the message M cannot be accessed or understood without knowledge of both a secret (private) key S corresponding to P and another secret key corresponding to B. In some embodiments, the first data package Z can represent the encryption of the message M and additional data, such as an identity of the sender 112 (cryptographic key A) and/or an identity of the recipient 116 (cryptographic key B). Thus, the first data package would be represented as $Z=E_{PB}(A, B, M)$. The cryptographic key B of the recipient 116 indicates an identity of the recipient 116. Any user, for example, the recipient 116, can in fact encrypt the message M using the public cryptographic key A of the sender 112, but only the sender 112 can decrypt $E_A(M)$ as long as the sender 112 has its corresponding private decryption key. The digital signature and encryption methods disclosed herein are non-malleable and CCA-2 secure. CCA-2 security refers to a ciphertext indistinguishability standard for cryptographic security. The digital signature and encryption methods disclosed herein are provably decipherable without revealing the private decryption keys. Moreover, the digital signature and encryption methods disclosed herein are secure against adaptive chosen message attacks.

The encryption described by the embodiments disclosed herein is implemented in more than one phase. For example, in a first phase, the computer device 104 can encrypt the message M using only the public key P to generate a data package $E_P(M)$. In a second phase, the computer device 104 can encrypt the message M using the public key P as well as a one-time or temporary key O to generate a data package $E_{PO}(M)$. The temporary key O is sometimes referred to as an ephemeral key. In some embodiments, encrypting a data package W using a public key Q includes encrypting the data package W in a private-key cryptosystem using a private key K and encrypting the private key K using the public key Q.

In some embodiments, the digital signature and encryption methods disclosed herein implement joint encryption. For example, P denotes a public encryption key and S denotes a corresponding private decryption key. Continuing the example, X denotes another public encryption key and $S_X$ denotes a corresponding secret key of X. The computer device 104 can compute, from P and X, a "joint" public encryption key PX, whose corresponding joint secret (private) key includes S and $S_X$. The encryption of the message M using the joint public encryption key PX is denoted by Z, where $Z=E_{PX}(M)$. Such an encrypted message can be decrypted when a computer device can access both S and $S_X$. When $Z=E_{PX}(M)$, PX denotes a joint public encryption key, and $S_X$ denotes the secret decryption key corresponding to the public key X, the computer device 108 can jointly decrypt the data package Z using the public key P, the public key X, the secret key S, and the secret key $S_X$ to obtain the message M. The data package $E_{PX}(M)$ remains secure as long as only the recipient 116 has access to the secret keys S and $S_X$. When $Z=E_{PX}(M)$ but another secret key S' is not the secret decryption key corresponding to P, then the data M' obtained by jointly decrypting the data package Z using the public key P, the public key X, the secret key S', and the secret key $S_X$ will be very different from the message M, and can be proven without revealing $S_X$.

After the computer device 104 has received the message M from the sender 112, the computer device 104 generates the corresponding public and secret (private) encryption pair (P, S) and computes data $Z=E_{PB}(A, B, M)$, which denotes a joint encryption using P and the public cryptographic key B of the recipient 116. Z denotes a first data package and identifies the sender 112 by A and the recipient 116 by B. In some embodiments, the first data package Z thus includes the cryptographic key B of the recipient and the cryptographic key A of the sender. The first data package Z does not contain S. The first data package Z thus excludes the private decryption key S needed by the recipient 116 to decrypt the first data package $E_{PB}(A, B, M)$ and access the message M.

The computer device 104 signs a second data package (A, B, P, t, H(Z)) using the cryptographic key A of the sender 112 to generate a third data package Y. The cryptographic key A of the sender 112 indicates an identity of the sender 112. The second data package thus includes the identity of the sender 112, the identity of the recipient 116, the public key P, and a hash function H(Z) of the first data package Z. In some embodiments, t denotes a deadline for either the sender 112 or recipient 116 to perform a follow-on function. For example, t can indicate a deadline for the computer device 104 to receive an acknowledgement of the third data package Y from the second computer device 108. In other embodiments, t specifies a future point in time after which the recipient 116 will be unable to restore the "fairness" of the transaction. The computer device 104 can also sign a second data package (A, B, P, $t_1$, $t_2$, H(Z)), where $t_1$ represents a first deadline for the computer device 104 to perform a first function and $t_2$ represents a second deadline for the computer device 108 to perform a second function.

An exchange or transaction is denoted as being "fair" if it is commercially equitable, such that a malicious entity does not benefit at the expense of a non-malicious entity. Continuing the example above in which the sender 112 has an automobile title and the recipient has an electronic address of a cryptoasset account. Neither party initially knows the other's asset, but will recognize it can access the asset. In an exchange protocol, it is desired (but not guaranteed) that the parties electronically exchange their assets, that is, the sender obtains the electronic address of the cryptoasset account and the recipient 116 obtains the automobile title. The exchange protocol is denoted as "fair" if (without forcing an exchange against the parties' will) the protocol provides that the recipient 116 obtains the automobile title if and only if the sender 112 obtains the electronic address of the cryptoasset account. The protocol should have only two possible commercially equitable outcomes: (1) the sender 112 obtains the electronic address of the cryptoasset account and the recipient 116 obtains the automobile title, or (2) neither party obtains the other's asset.

Continuing the example illustrated in FIG. 1, in some embodiments, t can be omitted or set to a large value, such as infinity. The computer device 104 generates the third data package $Y=SIG_A(A, B, P, t, H(Z))$ using the cryptographic key A of the sender 112. In some embodiments, H is a collision-resistant hash function. There is, therefore, only a very low probability that two different strings C and D can be found, such that H(C)=H(D)). The hash function H(Z) is used to encode Z, such that a first size of the first data package Z is larger than a second size of the third data package Y.

The computer device 104 transmits data 132 (the first data package Z and the third data package Y) to the computer device 108 associated with the recipient 116. Upon receiving data Y from the computer device 104, in some embodiments, the computer device 108 determines whether the current time is sufficiently before the deadline t, such that the computer device 108 can restore the fairness of the transaction if needed. The computer device 108 digitally signs data Y to generate data 136 ($SIG_B(Y)$). The data 136 is used as a receipt to indicate to the computer device 104 that the computer device 108 received data 132. For example, the computer device 104 receives the signed version $SIG_B(Y)$ of the third data package Y from the computer device 108. The signed version $SIG_B(Y)$ of the third data package Y is signed using the cryptographic key B of the recipient 116. In some embodiments, the second data package (A, B, P, t, H(Z)) denotes a deadline (using the value of t) for the computer device 104 to receive the signed version of the third data package Y from the computer device 108. For example, if t is violated, the transaction will be annulled or cancelled.

When the sender 112 receives the properly signed receipt (the signed version $SIG_B(Y)$ of the third data package Y) from the recipient 116, the sender 112 is supposed to send the data 140 (private key S) to the recipient 116. In some embodiments, t denotes a time deadline by which the computer device 104 is to transmit the private key S to the computer device 108 after the computer device 104 has received the data 136. If the computer device 108 determines that it has received the private key S at a time sufficiently earlier than the deadline t, the virtual blockchain protocol successfully completes.

In some embodiments, the computer device 108 determines a failure of the computer device 108 to receive the private key S (data 140) from the computer device 104. In other embodiments, the computer device 108 determines that the computer device 104 did not transmit the private key S to the computer device 108 by the deadline t. The FEE can thus be violated. In an example, the sender 112 is an automobile seller, the recipient 116 is an automobile buyer, and C denotes an offer to sell an automobile by the sender 112. The sender 112 transmits data $SIG_A(C)$ to the recipient 116, but the recipient 116 never responds. In this event, the sender 112 may sell its automobile to another buyer after which the recipient 116 claims the automobile. A party can thus recognize that it has obtained desired information, and then force the exchange to remain incomplete.

To implement an FEE, responsive to determining the failure to receive the private key S, the computer device 108 posts a challenge to the blockchain 120. The challenge includes the signed version $SIG_B(Y)$ of the third data package Y. The posting of the signed version $SIG_B(Y)$ to the blockchain 120 indicates, to the computer device 104, the failure of the computer device 108 to receive the private key S from the computer device 104. FIG. 1 illustrates that the computer device 108 posts the challenge in the block 124. In some embodiments, t denotes a deadline for the computer device 108 to post the signed version of the third data package Y to the blockchain 120. The second data package (A, B, P, t, H(Z)) thus indicates a deadline t=T1 by which time the computer device 108 is to post the challenge to the blockchain 120. If T1 is violated, the contract is nullified or cancelled and the sender 112 does not need to perform. If the data $SIG_B(Y)$ appears in the blockchain 120 within the time t (T1), the computer device 104 posts the private key S on the blockchain 120 within a given amount of time as long as the sender 112 wishes to perform honestly and complete the transaction fairly. The value of t (T1) allows the sender 112 to upper bound the time during which the transaction stays "open." Before sending the computer device 104 the receipt $SIG_B(Y)$, the recipient 116 can subjectively evaluate whether the recipient has time to react (by time T1) in case the computer device 104 does not transmit S to the recipient 116.

In some embodiments, the computer device 104 determines that the signed version $SIG_B(Y)$ of the third data package Y has been posted to the blockchain 120. Responsive to determining that the signed version $SIG_B(Y)$ of the third data package Y has been posted to the blockchain 120, the computer device 104 posts the private key S to the blockchain 120 for decrypting the message M by the recipient 116. For example, the private key S can be posted to the block 128. In some embodiments, the computer device 104 posts the private key S to the blockchain 120 responsive to determining that the signed version $SIG_B(Y)$ of the third data package Y is posted to the blockchain 120 at a time earlier the deadline T1. In some embodiments, t denotes a deadline T2 for the computer device 104 to post the private key S to the blockchain 120 after the signed version of the third data package Y is posted to the blockchain 120 by the computer device 108. The computer device 104 is to, therefore, post S to block 128 before time T2.

Continuing the example, the computer device 108 determines that the private key S is posted to the blockchain 120 by the computer device 104. The computer device 108 decrypts the first data package Z using the private key S to obtain the message M. On the other hand, if the computer device 104 fails to post S to the blockchain 120 within the deadline T2 after the posting of the data $SIG_B(Y)$, this signifies that the sender 112 agrees that the recipient 116 has not received the message M committed to by the function H(Z).

If the sender 112 acts honestly, then, given the data $SIG_B(Y)$, the sender 112 can, by releasing M and S, prove the content of the message for which $SIG_B(Y)$ is a receipt. Any entity can verify that S is the decryption key corresponding to P, and that the joint encryption of (A, B, M) relative to P and the cryptographic key B of the recipient 116 is indeed Z. Thus, any entity can verify that, given S, the recipient 116 can recover M. If the recipient 116 never received S, the computer device 108 is to timely post Y on the blockchain 120, such that the sender 112 is to publicly post S or publicly agree that the recipient 116 is "off the hook" relative to receiving the message M. For example, if the computer device 104 fails to timely post the private key S after Y has been timely posted to the blockchain 120, then the sender 112 can be caused to reimburse the recipient 116 for (at least some of) the transaction costs for posting Y to the blockchain 120.

In some embodiments, rather than using the single encryption $E_{PX}(A, B, M)$, the sender 112 can use two (or more) encryptions to transmit M, relative to different public keys. In some embodiments, the sender 112 can register multiple public encryption keys in the blockchain 120. In other embodiments, the recipient 116 may not have any registered public encryption key, but can generate the one(s) needed when the sender 112 alerts the recipient 116 that the sender 112 will transmit a certified message, for example, M. For example, the recipient 116 may possess only public signature key(s) and use them to authenticate any public encryption key the recipient 116 needs for the virtual blockchain protocol.

When receiving the value $Z=E_{PX}(A, B, M)$ from the computer device 104, the recipient is unable to readily decrypt M from Z (because S is not yet available). Thus, if the recipient 116 halts processing, the sender 112 will not receive the receipt $SIG_B(Y)$, and the recipient 116 will not receive the message M either. If the computer device 108 transmits the receipt $SIG_B(Y)$ to the computer device 104, then the sender 112 receives a valid receipt from the recipient 116 for the message M. Thus, for the exchange of the message M and the receipt $SIG_B(Y)$ to be fair, the recipient 116 should be able to readily easily obtain M. The FEE is implemented when the sender 112 transmits the private key S. If the sender 112 does not transmit the private key S, then the computer device 108 is to timely post the receipt $SIG_B(Y)$ to the blockchain 120, essentially requesting the computer device 104 to timely post S to the blockchain 120.

In some embodiments, the virtual blockchain protocol disclosed herein is used to implement an electronic checks and transfers system (outside the blockchain 120). For example, the recipient 116 is able to access the money from an electronic check if and only if the sender 112 receives a receipt that the recipient 116 received the check. In some embodiments, the virtual blockchain protocol disclosed herein can be used to implement a system in which an agent has an obligation to inform another agent (for example, regarding a deadline to exercise an option). The system performs in a manner that proves the agent complied with their obligations (for example, to inform a board of directors to notify employees of their option deadlines).

In some embodiments, the virtual blockchain protocol disclosed herein is used to implement a subscription-based model. In a subscription-based model, an entity is required to pay a recurring price at regular intervals for access to a product or service. To obtain the ability to use the blockchain, when needed, to restore the fairness of a transaction, the sender 112 and recipient 116 may be required to pay a monthly or annual subscription fee, for example, by posting a transaction to the blockchain 120, specifying a particular string (that denotes the type of service sought) and paying a fee. The type of service can be certified e-mail, electronically signed contracts, etc. The fee can be (a) paid to an entity (for example, a company, a foundation, etc.) that is responsible for maintaining the blockchain 120, (b) incorporated in a pool of transactions fees to be distributed to users contributing to the maintenance of the blockchain 120, (c) paid to a particular entity or user E, or (d) a combination thereof. If, for example, the recipient 116 has not paid such a subscription fee, then it is not enabled to use the blockchain 120 to restore fairness.

The advantages and benefits of the virtual blockchain protocol subscription-based model include the ability for users to perform multiple honest, fair exchanges at no additional cost. The company or foundation maintaining the blockchain 120 benefits from the subscription fees for providing a service that does not involve the company or foundation further in each transaction. If the subscription fees are incorporated into a transaction pool, the beneficiaries of the pool benefit further when a cheated user (for example, recipient 116) utilizes the blockchain 120 to post the data $SIG_B(Y)$ that restores the fairness of the transaction. In the virtual blockchain protocol, a user agrees to pay a subscription fee a priori. An a posteriori transaction fee is paid only for transactions in which cheating occurs. In traditional blockchain-based techniques, a user must agree to pay an a priori transaction fee for each transaction even when all parties are honest, because cheating can occur. Moreover, a subscriber F in a virtual blockchain protocol subscription-based model can represent a set of users rather than a single user. For example, F can represent a law firm and the subscription fee paid by F can be proportional to a numbers of users that use an FEE service implemented by the virtual blockchain protocol subscription-based model. In some embodiments, F can act on behalf of all users. For example, in a CEM system, F can represent a computer server that provides receipts for messages addressed to some of its users, and then distributes the messages internally as needed. The computer server can be implemented using the components illustrated and described in more detail with reference to FIG. 3.

Figure 2:
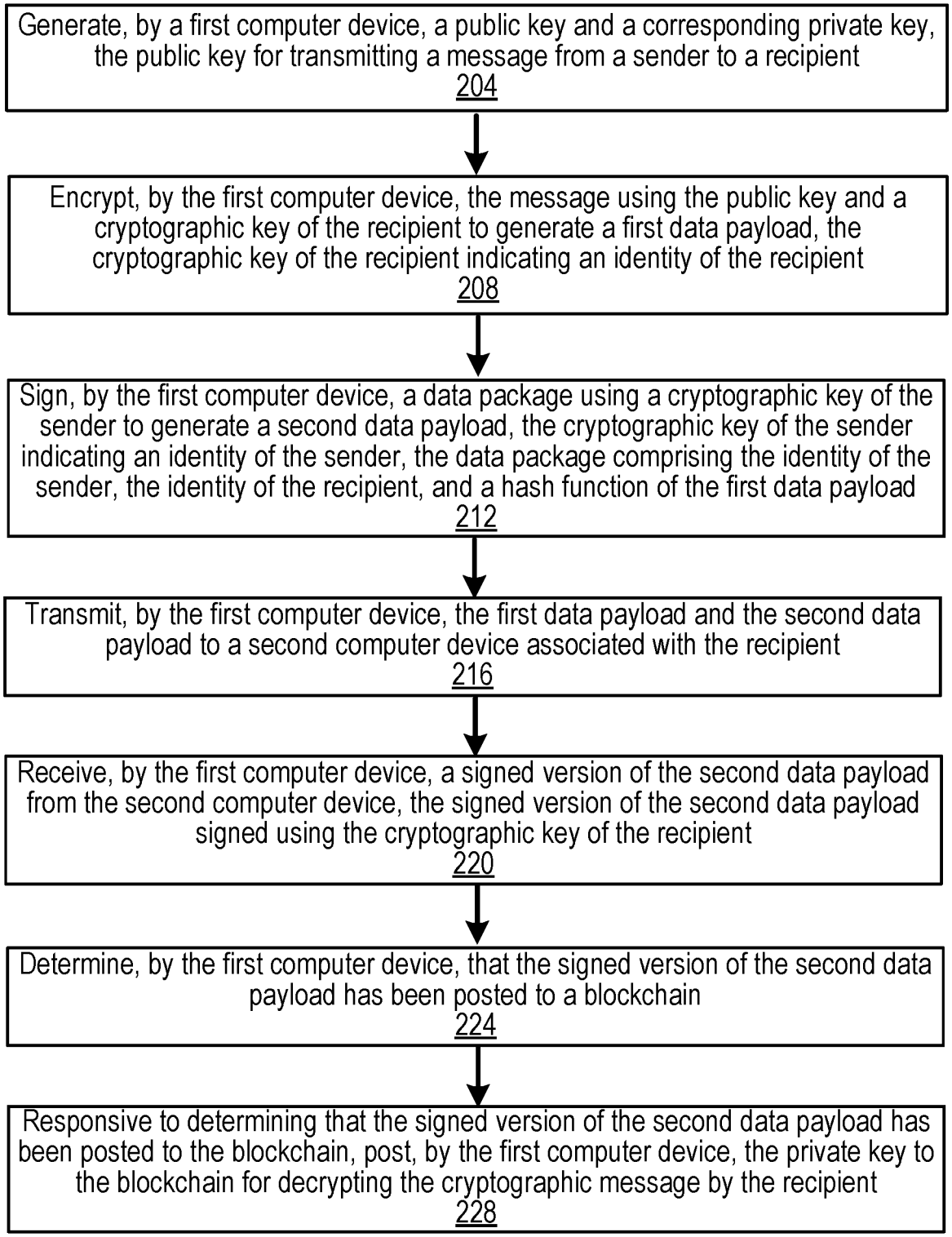
FIG. 2 illustrates a process for virtual blockchain protocols.

FIG. 2 illustrates a process for virtual blockchain protocols. In some embodiments, the process of FIG. 2 is performed by the computer device 104 illustrated and described in more detail with reference to FIG. 1. Other entities perform some or all of the steps of the process in other embodiments. Likewise, embodiments may include different and/or additional steps, or perform the steps in different orders.

The computer device 104 generates 204 a public key P and a corresponding private key S. The public key P and private key S are illustrated and described in more detail with reference to FIG. 1. The public key P is for transmitting a message M from a sender 112 to a recipient 116. The message M, sender 112, and recipient 116 are illustrated and described in more detail with reference to FIG. 1. The computer device 104 is associated with the sender 112.

The computer device 104 encrypts 208 the message M using the public key P and a cryptographic key B of the recipient 116 to generate a first data package Z. The cryptographic key B of the recipient 116 indicates an identity of the recipient 116. The first data package Z is expressed as $E_{PB}(A, B, M)$. Any user, for example, the recipient 116, can in fact encrypt the message M using the public cryptographic key A of the sender 112, but only the sender 112 can decrypt $E_A(M)$ as long as the sender 112 has its corresponding private decryption key.

The computer device 104 signs 212 a second data package (A, B, P, t, H(Z)) using a cryptographic key A of the sender 112 to generate a third data package Y. The cryptographic key A of the sender 112 indicates an identity of the sender 112. The second data package includes the identity of the sender 112, the identity of the recipient 116, the public key P, and a hash function H(Z) of the first data package. In some embodiments, t denotes a deadline for either the sender 112 or recipient 116 to perform a follow-on function. For example, t can indicates a deadline for the computer device 104 to receive an acknowledgement of the third data package Y from the second computer device 108. In other embodiments, t specifies a future point in time after which the recipient 116 will be unable to restore the fairness of the transaction.

The computer device 104 transmits 216 the first data package Z and the third data package Y to a computer device 108 associated with the recipient 116. Upon receiving data Y from the computer device 104, in some embodiments, the computer device 108 determines whether the current time is sufficiently before the deadline t, such that the computer device 108 can restore the fairness of the transaction if needed. The computer device 108 digitally signs data Y to generate data 136 ($SIG_B(Y)$). The data 136 is used as a receipt to indicate to the computer device 104 that the computer device 108 received data 132. The data 132 and data 136 are illustrated and described in more detail with reference to FIG. 1.

The computer device 104 receives 220 the signed version $SIG_B(Y)$ of the third data package Y from the computer device 108. The signed version $SIG_B(Y)$ of the third data package Y is signed using the cryptographic key B of the recipient 116. In some embodiments, the second data package (A, B, P, t, H(Z)) denotes a deadline (using the value of t) for the computer device 104 to receive the signed version of the third data package Y from the computer device 108. For example, if t is violated, the transaction will be annulled or cancelled.

The computer device 104 determines 224 that the signed version $SIG_B(Y)$ of the third data package Y has been posted to the blockchain 120 by the computer device 108. When the sender 112 receives the properly signed receipt (the signed version $SIG_B(Y)$ of the third data package Y) from the recipient 116, the sender 112 is supposed to send the data 140 (private key S) to the recipient 116. The data 140 is illustrated and described in more detail with reference to FIG. 1. When the computer device 108 determines a failure of the computer device 108 to receive the private key S (data 140) from the computer device 104, the computer device 108 posts the signed version $SIG_B(Y)$ of the third data package Y to the blockchain 120.

Responsive to determining that the signed version of the third data package Y has been posted to the blockchain 120, the computer device 104 posts 228 the private key S to the blockchain 120 for decrypting the message M by the recipient 116. In some embodiments, t denotes a deadline T2 for the computer device 104 to post the private key S to the blockchain 120 after the signed version of the third data package Y is posted to the blockchain 120 by the computer device 108. The computer device 104 is to, therefore, post S to block 128 before time T2.

Figure 3:
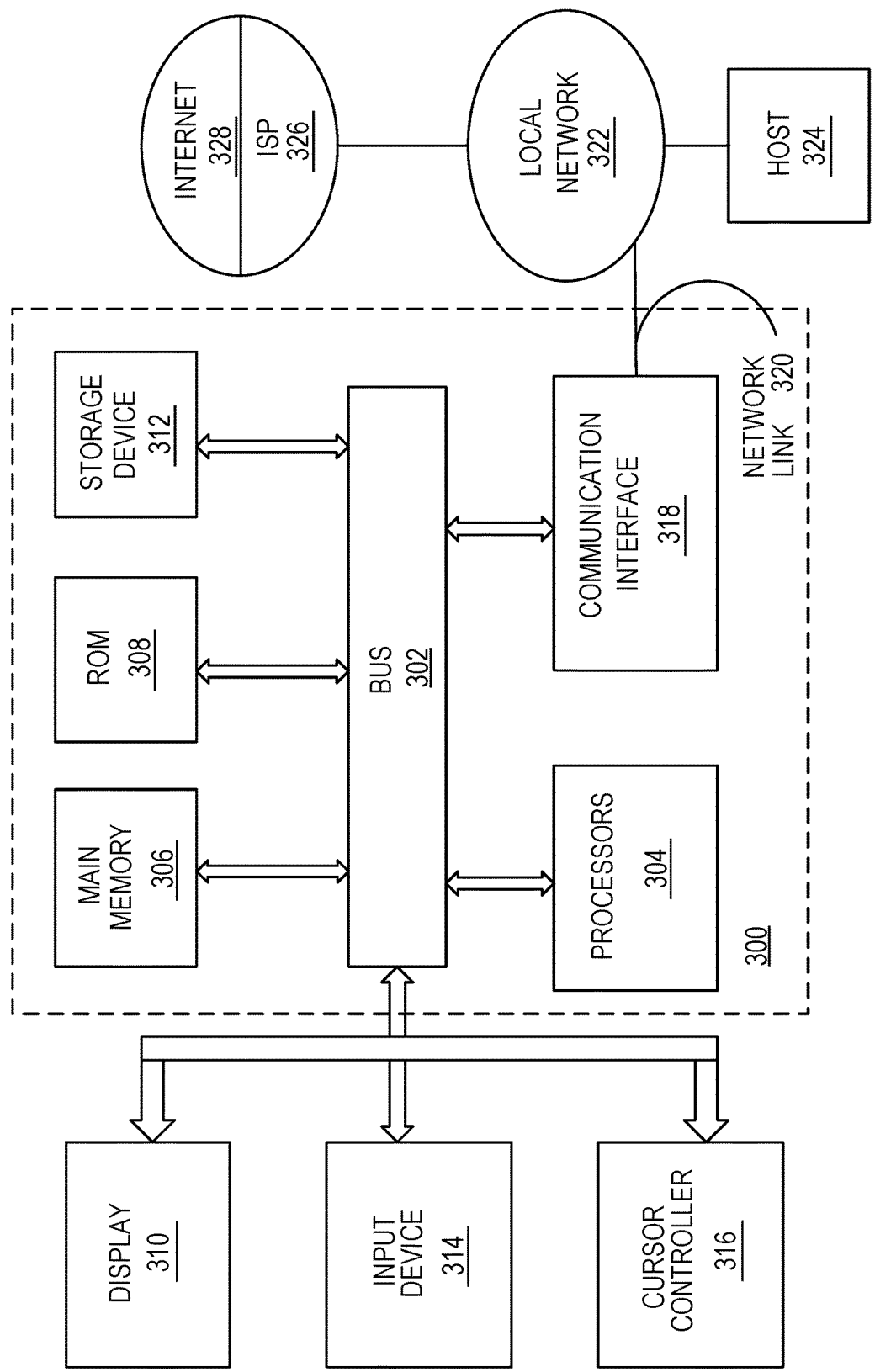
FIG. 3 illustrates an example machine.

FIG. 3 illustrates an example machine. In the implementation of FIG. 3, the computer system 300 is a special purpose computing device. The special-purpose computing device is hard-wired to execute blockchain protocols, includes digital electronic devices such as one or more application-specific integrated circuits (ASICs) or field programmable gate arrays (FPGAs) that are persistently programmed to perform the techniques herein, or includes one or more general purpose hardware processors programmed to perform the techniques pursuant to program instructions in firmware, memory, other storage, or a combination. In various implementations, the special-purpose computing devices are desktop computer systems, portable computer systems, handheld devices, network devices or any other device that incorporates both hard-wired or program logic to implement the techniques.

The computer system 300 includes a bus 302 or other communication mechanism for communicating information, and one or more computer hardware processors 304 coupled to the bus 302 for processing information. In some implementations, the hardware processors 304 are general-purpose microprocessors. The computer system 300 also includes a main memory 306, such as a random-access memory (RAM) or other dynamic storage device, coupled to the bus 302 for storing information and instructions to be executed by processors 304. In one implementation, the main memory 306 is used for storing temporary variables or other intermediate information during execution of instructions to be executed by the processors 304. Such instructions, when stored in non-transitory storage media accessible to the processors 304, render the computer system 300 into a special-purpose machine customized to perform the operations specified in the instructions.

In an implementation, the computer system 300 further includes a read only memory (ROM) 308 or other static storage device coupled to the bus 302 for storing static information and instructions for the processors 304. A storage device 312, such as a magnetic disk, optical disk, solid-state drive, or three-dimensional cross point memory is provided and coupled to the bus 302 for storing information and instructions.

In an implementation, the computer system 300 is coupled via the bus 302 to a display 310, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processors 304. Another type of user input device is a cursor controller 316, such as a mouse, a trackball, a touch-enabled display, or cursor direction keys for communicating direction information and command selections to the processors 304 and for controlling cursor movement on the display 310.

According to one implementation, the techniques herein are performed by the computer system 300 in response to the processors 304 executing one or more sequences of one or more instructions contained in the main memory 306. Such instructions are read into the main memory 306 from another storage medium, such as the storage device 312. Execution of the sequences of instructions contained in the main memory 306 causes the processors 304 to perform the process steps described herein. In alternative implementations, hard-wired circuitry is used in place of or in combination with software instructions.

The term "storage media" as used herein refers to any non-transitory media that store both data or instructions that cause a machine to operate in a specific fashion. Such storage media includes both non-volatile media or volatile media. Non-volatile media includes, such as optical disks, magnetic disks, solid-state drives, or three-dimensional cross point memory, such as the storage device 312. Common forms of storage media include, such as a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge. Storage media is distinct from but is used in conjunction with transmission media. Transmission media participates in transferring information between storage media. Transmission media includes coaxial cables, copper wire and fiber optics, including the wires that include the bus 302.

In an implementation, various forms of media are involved in carrying one or more sequences of one or more instructions to the processors 304 for execution. The instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processors 304 retrieves and executes the instructions. The instructions received by the main memory 306 are optionally stored on the storage device 312 either before or after execution by processors 304.

The computer system 300 also includes a communication interface 318 coupled to the bus 302. The communication interface 318 provides a two-way data communication coupling to a network link 320 connected to a local network 322. The communication interface 318 is an integrated service digital network (ISDN) card, cable modem, satellite modem, or a modem to provide a data communication connection to a corresponding type of telephone line. In another implementation, the communication interface 318 is a local area network (LAN) card to provide a data communication connection to a compatible LAN. In some implementations, wireless links are also implemented.

The network link 320 typically provides data communication through one or more networks to other data devices. The network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
   generating, by a first computer device, a public key and a corresponding private key, the public key for transmitting a message from a sender to a recipient, the first computer device associated with the sender;
   encrypting, by the first computer device, the message using the public key and a cryptographic key of the recipient to generate a first data package, the cryptographic key of the recipient indicating an identity of the recipient;
   signing, by the first computer device, a second data package using a cryptographic key of the sender to generate a third data package, the cryptographic key of the sender indicating an identity of the sender, the second data package comprising the identity of the sender, the identity of the recipient, the public key, and a hash function of the first data package;
   transmitting, by the first computer device, the first data package and the third data package to a second computer device associated with the recipient;
   receiving, by the first computer device, a signed version of the third data package from the second computer device, the signed version of the third data package signed using the cryptographic key of the recipient;
   determining, by the first computer device, that the signed version of the third data package has been posted to a blockchain; and
   responsive to the determining that the signed version of the third data package has been posted to the blockchain, posting, by the first computer device, the private key to the blockchain for decrypting the message by the recipient.

2. The method of claim 1, wherein the second data package indicates a deadline for the first computer device to receive the signed version of the third data package from the second computer device.

3. The method of claim 1, wherein the second data package indicates a deadline for the second computer device to post the signed version of the third data package to the blockchain, and wherein the first computer device posts the private key to the blockchain responsive to determining that the signed version of the third data package is posted to the blockchain at a time earlier than the deadline.

4. The method of claim 1, wherein the hash function is a collision-resistant hash function, and wherein a first size of the first data package is larger than a second size of the third data package.

5. The method of claim 1, wherein the third data package indicates a deadline for the first computer device to post the private key to the blockchain after the signed version of the third data package is posted to the blockchain by the second computer device.

6. The method of claim 1, wherein the first data package further comprises the cryptographic key of the recipient and the cryptographic key of the sender.

7. A method comprising:
   receiving, by a first computer device associated with a recipient of a message, a first data package and a third data package from a second computer device associated with a sender of the message, the first data package excluding a private key for decrypting the message, the third data package generated by signing a second data package using a cryptographic key of the sender that indicates an identity of the sender, the second data package comprising the identity of the sender, an identity of the recipient, a public key for transmitting the message, and a hash function of the first data package;
   transmitting, by the first computer device, a signed version of the third data package to the second computer device, the third data package signed using a cryptographic key of the recipient indicating the identity of the recipient;
   determining, by the first computer device, a failure of the first computer device to receive the private key from the second computer device; and
   responsive to the determining of the failure to receive the private key, posting, by the first computer device, the signed version of the third data package to a blockchain, the posting of the signed version of the third data package indicating, to the second computer device, the failure of the first computer device to receive the private key from the second computer device.

8. The method of claim 7, wherein the first data package is generated by encrypting the message using the public key and the cryptographic key of the recipient.

9. The method of claim 7, wherein the hash function of the first data package is a collision-resistant hash function, and wherein a first size of the first data package is larger than a second size of the third data package.

10. The method of claim 7, further comprising:
    determining, by the first computer device, that the private key is posted to the blockchain by the second computer device; and
    decrypting, by the first computer device, the first data package using the private key to obtain the message.

11. A method comprising:
  generating, by a first computer device, a public key and a private key, the public key for transmitting a message from a sender to a recipient;
  encrypting, by the first computer device, the message using the public key and a cryptographic key of the recipient to generate a first data package;
  signing, by the first computer device, a second data package comprising a hash function of the first data package, using a cryptographic key of the sender to generate a third data package;
  transmitting, by the first computer device, the first data package and the third data package to a second computer device;
  receiving, by the first computer device, a signed version of the third data package signed using the cryptographic key of the recipient from the second computer device;
  determining, by the first computer device, that the signed version of the third data package has been posted to a blockchain; and
  posting, by the first computer device, the private key to the blockchain.

12. The method of claim 11, wherein the second data package indicates a deadline for the first computer device to receive the signed version of the third data package.

13. The method of claim 11, wherein the second data package indicates a deadline for the second computer device to post the signed version of the third data package to the blockchain.

14. The method of claim 11, wherein the hash function is a collision-resistant hash function, and wherein a first size of the first data package is larger than a second size of the third data package.

15. The method of claim 11, wherein the third data package indicates a deadline for the first computer device to post the private key to the blockchain after the signed version of the third data package is posted to the blockchain by the second computer device.

16. A method comprising:
  receiving, by a first computer device, a first data package and a third data package from a second computer device, the first data package comprising a message from a sender to a recipient and excluding a private key for decrypting the message;
  transmitting, by the first computer device, a signed version of the third data package to the second computer device, the third data package signed using a cryptographic key of the recipient indicating an identity of the recipient;
  determining, by the first computer device, a failure to receive the private key from the second computer device; and
  responsive to the determining of the failure to receive the private key, posting, by the first computer device, the signed version of the third data package to a blockchain.

17. The method of claim 16, wherein the first data package is generated by encrypting the message using a public key generated by the second computer device and the cryptographic key of the recipient.

18. The method of claim 16, wherein the third data package is generated by signing a second data package using a cryptographic key of the sender indicating an identity of the sender, the second data package comprising the identity of the sender, the identity of the recipient, the public key, and a hash function of the first data package.

19. The method of claim 16, wherein the hash function of the first data package is a collision-resistant hash function, and wherein a first size of the first data package is larger than a second size of the third data package.

20. The method of claim 16, further comprising:
  determining, by the first computer device, that the private key is posted to the blockchain; and
  decrypting, by the first computer device, the first data package using the private key to obtain the message.

21. A method comprising:
  generating, by a first computer device, a public key and a private key, the public key for transmitting a message from a sender to a recipient;
  encrypting, by the first computer device, the message using the public key and a cryptographic key of the recipient to generate a first data package;
  signing, by the first computer device, a hash function of the first data package using a cryptographic key of the sender to generate a second data package;
  transmitting, by the first computer device, the first data package and the second data package to a second computer device;
  receiving, by the first computer device, a signed version of the second data package signed using the cryptographic key of the recipient from the second computer device;
  determining, by the first computer device, that the signed version of the second data package has been posted to a blockchain; and
  posting, by the first computer device, the private key to the blockchain.

* * * * *